US012315433B2

(12) United States Patent
Pyun et al.

(10) Patent No.: US 12,315,433 B2
(45) Date of Patent: May 27, 2025

(54) DISPLAY DEVICE AND METHOD OF DRIVING THE SAME

(71) Applicant: SAMSUNG DISPLAY CO., LTD., Yongin-si (KR)

(72) Inventors: Kihyun Pyun, Gwangmyeong-si (KR); Min-Soo Choi, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 106 days.

(21) Appl. No.: 18/295,052

(22) Filed: Apr. 3, 2023

(65) Prior Publication Data

US 2023/0360592 A1 Nov. 9, 2023

(30) Foreign Application Priority Data

May 4, 2022 (KR) ........................ 10-2022-0055473

(51) Int. Cl.
*G09G 3/32* (2016.01)
*G09G 3/20* (2006.01)

(52) U.S. Cl.
CPC ............ *G09G 3/32* (2013.01); *G09G 3/2096* (2013.01); *G09G 2300/0819* (2013.01); *G09G 2300/0842* (2013.01); *G09G 2310/0275* (2013.01); *G09G 2310/08* (2013.01); *G09G 2330/06* (2013.01)

(58) Field of Classification Search
CPC .................. G09G 3/32; G09G 3/2096; G09G 2300/0819; G09G 2300/0842; G09G 2310/0275; G09G 2310/08; G09G 2330/06; G09G 2310/0251; G09G 2320/0233; G09G 2360/16; G09G 3/3275; G09G 3/3233; G09G 2300/0809; G09G 2310/0272; G09G 2330/028
See application file for complete search history.

(56) References Cited

U.S. PATENT DOCUMENTS

2020/0264476 A1* 8/2020 Yashiki ................ G09G 3/3426
2021/0287608 A1* 9/2021 Min ..................... G09G 3/3291

FOREIGN PATENT DOCUMENTS

KR 10-1040786 6/2011
KR 10-2000643 7/2019
KR 10-2020-0054421 6/2020

* cited by examiner

*Primary Examiner* — Andrew Sasinowski
(74) *Attorney, Agent, or Firm* — F. CHAU & ASSOCIATES, LLC

(57) ABSTRACT

A display device includes a display panel including a plurality of pixels, a data driver configured to apply a plurality of data voltages generated based on input image data to the pixels, an initialization voltage generator configured to generate an initialization voltage that initializes a light emitting element included in each of the pixels, a timing controller configured to generate a constant current control signal based on a load of the input image data, and a constant current generator configured to generate and transmit a constant current to the initialization voltage generator in response to the constant current control signal. As a result, the display device may reduce ripple of an initialization voltage by adjusting the initialization voltage according to a load of input image data, and a display device having a desirable signal-to-noise ratio (SNR) characteristic of a sensing operation may be provided.

19 Claims, 17 Drawing Sheets

CC LUT

| CCV | LD |
|---|---|
| 0mA | 0% |
| 100mA | 0% < LD ≤ 30% |
| 200mA | 30% < LD ≤ 60% |
| 300mA | 60% < LD ≤ 100% |

RLD1 = 30%
RLD2 = 60%
CCV1 = 100mA
CCV2 = 200mA
CCV3 = 300mA

FIG. 10

| CCS | | | CC |
|---|---|---|---|
| B1 | B2 | B3 | |
| LOW | LOW | LOW | 0mA |
| HIGH | LOW | LOW | 100mA |
| HIGH | HIGH | LOW | 200mA |
| HIGH | HIGH | HIGH | 300mA |

CCV1 = 100mA
CCV2 = 200mA
CCV3 = 300mA

FIG. 17

CC LUT

| CC | LD |
|---|---|
| 0mA | 0% |
| 100mA | 0% < LD ≤ 20% |
| 200mA | 20% < LD ≤ 40% |
| 300mA | 40% < LD ≤ 60% |
| 400mA | 60% < LD ≤ 80% |
| 500mA | 80% < LD ≤ 100% |

RLD1 = 20%
RLD2 = 40%
RLD3 = 60%
RLD4 = 80%
CCV1 = 100mA
CCV2 = 200mA
CCV3 = 300mA
CCV4 = 400mA
CCV5 = 500mA

FIG. 18

| CCS | | | | | CC |
|---|---|---|---|---|---|
| B0 | B1 | B2 | B3 | B4 | |
| LOW | LOW | LOW | LOW | LOW | 0mA |
| HIGH | LOW | LOW | LOW | LOW | 100mA |
| HIGH | HIGH | LOW | LOW | LOW | 200mA |
| HIGH | HIGH | HIGH | LOW | LOW | 300mA |
| HIGH | HIGH | HIGH | LOW | LOW | 400mA |
| HIGH | HIGH | HIGH | HIGH | HIGH | 500mA |

CCV1 = 100mA
CCV2 = 200mA
CCV3 = 300mA
CCV4 = 400mA
CCV5 = 500mA

DISPLAY DEVICE AND METHOD OF DRIVING THE SAME

CROSS-REFERENCE TO RELATED APPLICATIONS

This application claims priority under 35 U.S.C. § 119 to Korean Patent Application No. 10-2022-0055473, filed on May 4, 2022 in the Korean Intellectual Property Office, the disclosure of which is incorporated by reference in its entirety.

TECHNICAL FIELD

Embodiments of the present inventive concept relate to a display device and a method of driving the display device. More particularly, embodiments of the present inventive concept relate to a display device that performs a sensing operation and a method of driving the display device.

DISCUSSION OF RELATED ART

Generally, a display device includes a display panel, a timing controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

SUMMARY

Embodiments of the present inventive concept provide a display device that reduces ripple of an initialization voltage.

Embodiments of the present inventive concept also provide a method of driving the display device.

According to embodiments of the present inventive concept, a display device includes a display panel including a plurality of pixels, a data driver configured to apply a plurality of data voltages generated based on input image data to the pixels, an initialization voltage generator configured to generate an initialization voltage that initializes a light emitting element included in each of the pixels, a timing controller configured to generate a constant current control signal based on a load of the input image data, and a constant current generator configured to generate and transmit a constant current to the initialization voltage generator in response to the constant current control signal.

In an embodiment, each of the pixels includes a first transistor including a control electrode connected to a first node, a first electrode configured to receive a first power voltage, and a second electrode connected to a second node. Each of the pixels further includes a second transistor including a control electrode configured to receive a first gate signal, a first electrode configured to receive the data voltages, and a second electrode connected to the first node. Each of the pixels further includes a third transistor including a control electrode configured to receive a second gate signal, a first electrode configured to receive the initialization voltage, and a second electrode connected to the second node. Each of the pixels further includes a storage capacitor including a first electrode connected to the first node and a second electrode connected to the second node. Each of the pixels further includes the light emitting element including a first electrode connected to the second node and a second electrode configured to receive a second power voltage.

In an embodiment, the data driver is configured to write the data voltages to the pixels in an active period, and the constant current generator is configured to generate the constant current in a blank period.

In an embodiment, the data driver is configured to perform a sensing operation in the blank period.

In an embodiment, the timing controller is configured to generate the constant current control signal corresponding to a set constant current value determined based on the load, and the constant current generator is configured to generate the constant current having the set constant current value.

In an embodiment, the set constant current value is a constant current value corresponding to the load among a plurality of constant current values stored in a constant current lookup table.

In an embodiment, the set constant current value is 0 when the load is 0.

In an embodiment, the set constant current value is greater when the load is greater than a first reference load than when the load is less than or equal to the first reference load.

In an embodiment, the set constant current value is a first constant current value when the load is greater than 0 and less than or equal to a first reference load, the set constant current value is a second constant current value greater than the first constant current value when the load is greater than the first reference load and less than or equal to a second reference load, and the set constant current value is a third constant current value greater than the second constant current value when the load is greater than the second reference load.

In an embodiment, the constant current control signal includes a first reference signal, a second reference signal, and a third reference signal. The first reference signal has an activation level when the set constant current value is greater than or equal to the first constant current value, the second reference signal has the activation level when the set constant current value is greater than or equal to the second constant current value, the third reference signal has the activation level when the set constant current value is greater than or equal to the third constant current value, and the constant current generator is configured to generate the constant current based on the first reference signal, the second reference signal, and the third reference signal.

In an embodiment, the constant current generator includes a reference voltage determiner circuit configured to determine a reference voltage based on the first reference signal, the second reference signal, and the third reference signal, and a constant current generation circuit configured to generate the constant current based on the reference voltage.

In an embodiment, the constant current generation circuit includes a comparator including a first input terminal configured to receive the reference voltage, a second input terminal connected to a first node, and an output terminal. The constant current generation circuit further includes a first transistor including a control electrode configured to receive a blank signal having the activation level in the blank period, a first electrode connected to an output terminal of the initialization voltage generator, and a second electrode connected to a second node. The constant current generation circuit further includes a second transistor including a control electrode connected to the output terminal of the comparator, a first electrode connected to the second node, and a second electrode connected to a first electrode of a first switch. The constant current generation circuit further includes the first switch configured to switch in response to the first reference signal, and including a first electrode connected to the second electrode of the second transistor and a second electrode connected to the first node. The constant current generation circuit further includes a third transistor including a control electrode connected to the output terminal of the comparator, a first electrode connected to the second node and a second electrode connected to a first electrode of a second switch. The constant current generation circuit further includes the second switch configured to switch in response to the second reference signal, and including a first electrode connected to the second electrode of the third transistor and a second electrode connected to the first node. The constant current generation circuit further includes a fourth transistor including a control electrode connected to the output terminal of the comparator, a first electrode connected to the second node, and a second electrode connected to a first electrode of a third switch. The constant current generation circuit further includes the third switch configured to switch in response to the third reference signal, and including a first electrode connected to the second electrode of the fourth transistor and a second electrode connected to the first node. The constant current generation circuit further includes a resistance element including a first electrode connected to the first node and a grounded second electrode.

In an embodiment, a voltage of the output terminal of the comparator increases as the reference voltage increases, and the comparator matches a voltage of the first input terminal of the comparator and a voltage of the second input terminal of the comparator.

In an embodiment, the reference voltage determiner circuit is configured to determine the reference voltage as a first voltage value when the first reference signal has the activation level and the second reference signal and the third reference signal have a deactivation level, the reference voltage determiner circuit is configured to determine the reference voltage as a second voltage value greater than the first voltage value when the first reference signal and the second reference signal have the activation level and the third reference signal has the deactivation level, and the reference voltage determiner circuit is configured to determine the reference voltage as a third voltage value greater than the second voltage value when the first reference signal, the second reference signal, and the third reference signal have the activation level.

According to embodiments of the present inventive concept, a method of driving a display device includes calculating a load of input image data, determining a set constant current value based on the load of the input image data, and generating and transmitting a constant current having the set constant current value to an initialization voltage generator configured to generate an initialization voltage that initializes a light emitting element.

In an embodiment, the method further includes writing a plurality of data voltages generated based on the input image data to a plurality of pixels including the light emitting element in an active period, and the constant current is generated in a blank period.

In an embodiment, the method further includes performing a sensing operation in the blank period.

In an embodiment, the set constant current value is a constant current value corresponding to the load among a plurality of constant current values stored in a constant current lookup table.

In an embodiment, the set constant current value is greater when the load is greater than a first reference load than when the load is less than or equal to the first reference load.

In an embodiment, the set constant current value is a first constant current value when the load is greater than 0 and less than or equal to a first reference load, the set constant current value is a second constant current value greater than the first constant current value when the load is greater than the first reference load and less than or equal to a second reference load, and the set constant current value is a third constant current value greater than the second constant current value when the load is greater than the second reference load.

According to embodiments of the present inventive concept, a display device may adjust an initialization voltage according to a load of input image data by including a display panel including a plurality of pixels, a data driver that applies a plurality of data voltages generated based on the input image data to the pixels, an initialization voltage generator that generates the initialization voltage that initializes a light emitting element included in each of the pixels, a timing controller that generates a constant current control signal based on a load of the input image data, and a constant current generator that generates and transmits a constant current to the initialization voltage generator in response to the constant current control signal.

In addition, the method of driving the display device according to embodiments of the present inventive concept may reduce ripple of an initialization voltage by adjusting the initialization voltage according to a load of input image data. Accordingly, a display device having a desirable signal-to-noise ratio (SNR) characteristic of a sensing operation may be provided.

However, the effects of embodiments of the present inventive concept are not limited to the above-described effects, and may be variously expanded without departing from the spirit and scope of the present inventive concept.

BRIEF DESCRIPTION OF THE DRAWINGS

The above and other features of the present inventive concept will become more apparent by describing in detail embodiments thereof with reference to the accompanying drawings.

FIG. 10 is a table illustrating an example of a constant current control signal of the display device of FIG. 1.

FIG. 17 is a table illustrating an example of a constant current lookup table of the display device of FIG. 16.

FIG. 18 is a table illustrating an example of a constant current control signal of the display device of FIG. 16.

DETAILED DESCRIPTION

Figure 1:
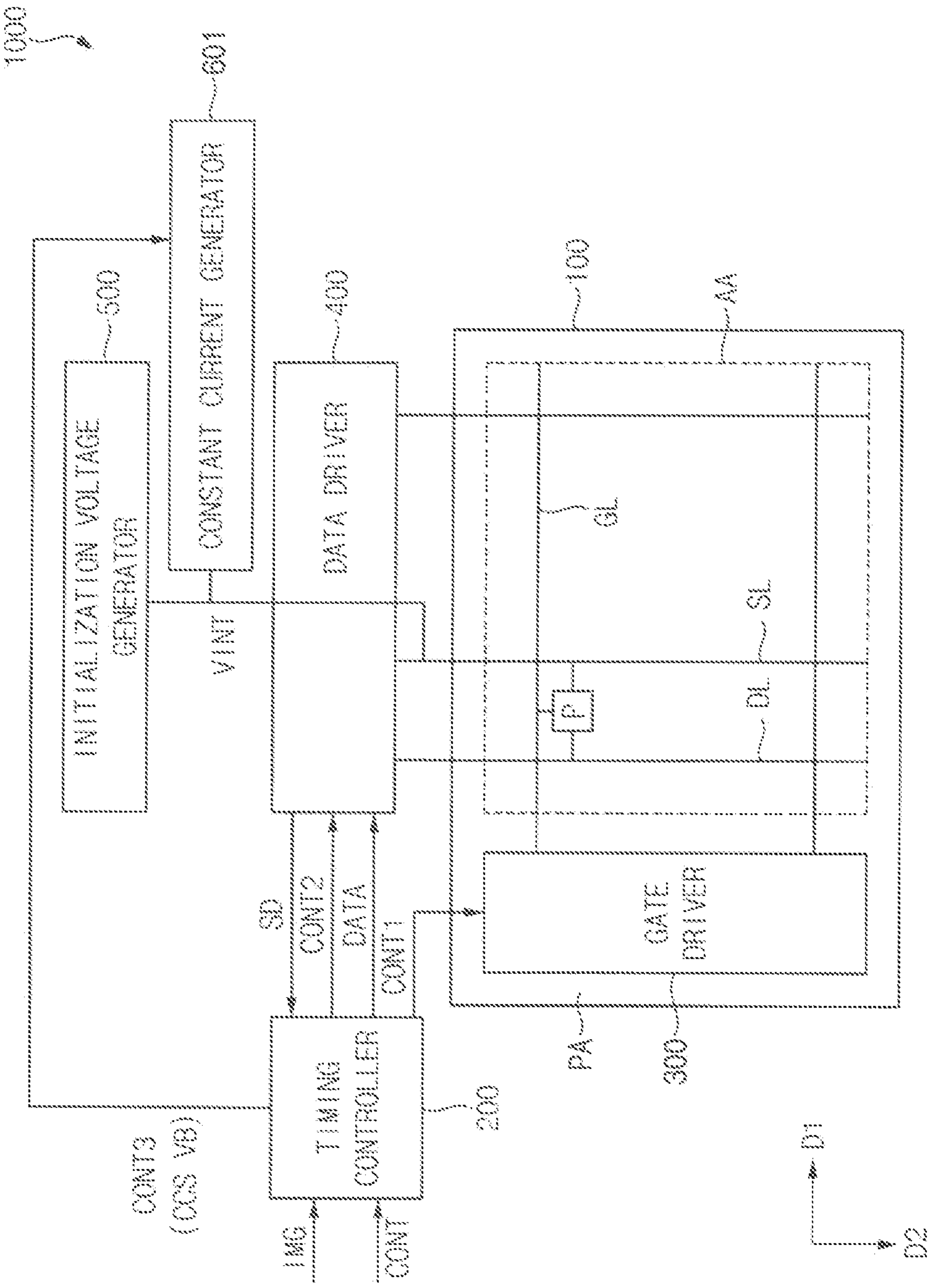
FIG. 1 is a block diagram illustrating a display device according to embodiments of the present inventive concept.

Embodiments of the present inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

FIG. 1 is a block diagram illustrating a display device 1000 according to embodiments of the present inventive concept.

Referring to FIG. 1, in an embodiment, the display device 1000 includes a display panel 100, a timing controller 200 (also referred to as a timing controller circuit), a gate driver 300 (also referred to as a gate driver circuit), a data driver 400 (also referred to as a data driver circuit), an initialization voltage generator 500 (also referred to as an initialization voltage generator circuit), and a constant current generator 601 (also referred to as a constant current generator circuit). In an embodiment, the timing controller 200 and the data driver 400 may be integrated into one chip.

The display panel 100 has a display region AA in which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, a plurality of sensing lines SL, and a plurality of pixels P electrically connected to the data lines DL, the gate lines GL, and the sensing lines SL. The gate lines GL may extend in a first direction D1 and be spaced apart from each other in a second direction D2, and the data lines DL and the sensing lines SL may extend in the second direction D2 crossing the first direction D1 and be spaced apart from each other in the first direction D1.

The timing controller 200 may receive input image data IMG and an input control signal CONT from a host processor (e.g., a graphic processing unit (GPU)). For example, the input image data IMG may include red image data, green image data and blue image data. In an embodiment, the input image data IMG may further include white image data. In an embodiment, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may receive sensing data SD from the data driver 400. The timing controller may compensate for differences in characteristics such as threshold voltage and mobility of a driving transistor generated for each pixel P based on the sensing data SD. That is, the timing controller 200 may compensate for the input image data IMG based on the sensing data SD.

The timing controller 200 may generate a first control signal CONT1, a second control signal CONT2, a third control signal CONT3, and data signal DATA based on the input image data IMG and the input control signal CONT.

The timing controller 200 may generate the first control signal CONT1, which controls operation of the gate driver 300 based on the input control signal CONT, and output the first control signal CONT1 to the gate driver 300. The first control signal CONT1 may include a vertical start signal and a gate clock signal.

The timing controller 200 may generate the second control signal CONT2, which controls operation of the data driver 400 based on the input control signal CONT, and output the second control signal CONT2 to the data driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the data driver 400.

The timing controller 200 may generate the third control signal CONT3, which controls operation of the constant current generator 601, based on the input control signal CONT, and output the third control signal CONT3 to the constant current generator 601. The third control signal CONT3 may include a constant current control signal CCS and a blank signal VB.

The gate driver 300 may generate gate signals, which drive the gate lines GL, in response to the first control signal CONT1 input from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltage to the data lines DL.

The data driver 400 may sense the pixels P to generate the sensing data SD. The data driver 400 may output the sensing data SD to the timing controller 200.

The initialization voltage generator 500 may generate an initialization voltage for initializing the light emitting element included in each of the pixels P. The initialization voltage generator 500 may output the initialization voltage to the sensing lines SL.

The constant current generator 601 may generate a constant current in response to the third control signal CONT3 received from the timing controller 200. For example, the constant current generator 601 may generate and transmit the constant current to the initialization voltage generator 500 in response to the constant current control signal CCS. A detailed description thereof will be given later.

Figure 2:
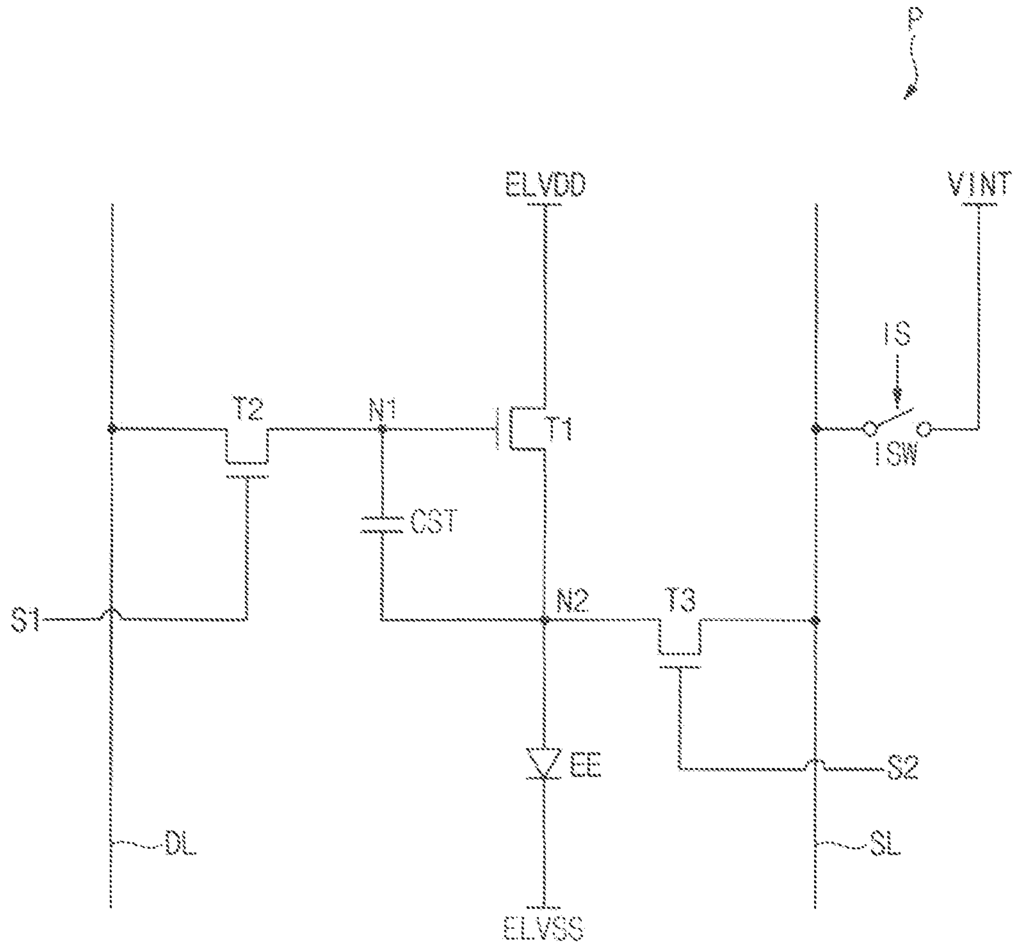
FIG. 2 is a circuit diagram illustrating an example of pixels of the display device of FIG. 1.

FIG. 2 is a circuit diagram illustrating an example of pixels of the display device of FIG. 1.

Referring to FIG. 2, in an embodiment, each of the pixels P includes a first transistor T1 (e.g., the driving transistor) including a control electrode connected to a first node N1, a first electrode receiving a first power voltage ELVDD (e.g., a high power voltage), and a second electrode connected to a second node N2. Each of the pixels further includes a second transistor T2 including a control electrode receiving a first gate signal S1, a first electrode receiving data voltages VDATA from a data line DL, and a second electrode connected to the first node N1. Each of the pixels further includes a third transistor T3 including a control electrode receiving a second gate signal S2, a first electrode receiving the initialization voltage VINT, and a second electrode connected to the second node N2. Each of the pixels further includes a storage capacitor CST including a first electrode connected to the first node N1 and a second electrode connected to the second node N2. Each of the pixels further includes a light emitting element EE including a first electrode connected to the second node N2 and a second electrode receiving a second power voltage ELVSS (e.g., a low power voltage). As shown in FIG. 2, the transistors may be implemented as NMOS transistors, but is not limited thereto.

An initialization switch ISW may be turned on in response to an initialization signal IS. That is, the initialization voltage VINT may be applied to the pixels P through the sensing lines SL in response to the initialization signal IS.

Figure 3:
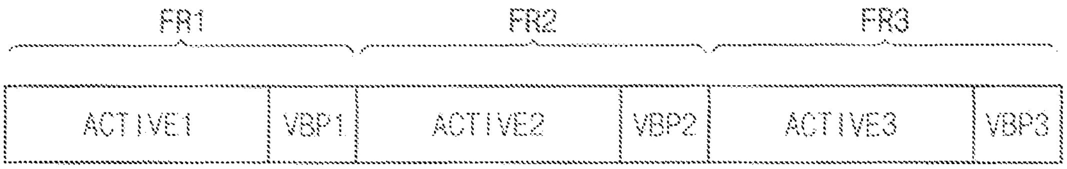
FIG. 3 is a conceptual diagram illustrating a driving timing of the display device of FIG. 1 according to embodiments of the present inventive concept.

FIG. 3 is a conceptual diagram illustrating a driving timing of the display device of FIG. 1 according to embodiments of the present inventive concept.

Referring to FIGS. 1 to 3, in active periods ACTIVE1, ACTIVE2, and ACTIVE3, the data driver 400 may apply the data voltages VDATA generated based on the input image data IMG to the pixels P. In blank periods VBP1, VBP2, and VBP3, the data driver 400 may sense some of the pixels P to generate the sensing data SD. For example, in one blank period VBP1, VBP2, and VBP3, the data driver 400 may sense the pixels P included in one pixel row to generate the sensing data SD. In an embodiment, a dummy period may be included between the active periods ACTIVE1, ACTIVE2, and ACTIVE3 and the blank periods VBP1, VBP2, and VBP3. In the dummy period, the data driver 400 does not apply the data voltages VDATA, and the data driver 400 does not sense the pixels P to generate the sensing data SD.

The display device 1000 may be driven in units of frames. Frames FR1, FR2, and FR3 may include the active periods ACTIVE1, ACTIVE2, and ACTIVE3 and the blank periods VBP1, VBP2, and VBP3. According to embodiments, the data voltage VDATA may be written to the pixels P in the active periods ACTIVE1, ACTIVE2, and ACTIVE3, and the data voltage VDATA is not written to the pixels Pin the blank periods VBP1, VBP2, and VBP3.

For example, a sensing operation (e.g., generating the sensing data SD based on a signal of the second node N2) may be performed in the blank periods VBP1, VBP2, and VBP3. For example, the sensing data SD may be generated in a first blank period VBP1, and the data voltages VDATA compensated based on the sensing data SD generated in the first blank period VBP1 may be written to the pixels P in the second active period ACTIVE2. For example, the sensing data SD may be generated in a second blank period VBP2, and the data voltages VDATA compensated based on the sensing data SD generated in the second blank period VBP2 may be written to the pixels P in the third active period ACTIVE3.

Figure 4:
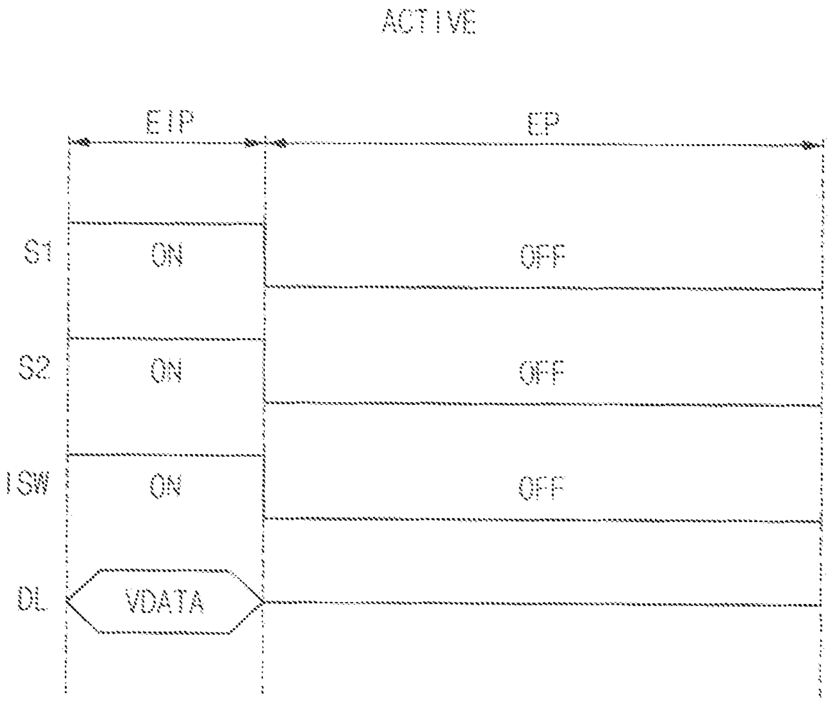
FIG. 4 is a timing diagram illustrating an example in which the display device of FIG. 1 operates in an active period.

FIG. 4 is a timing diagram illustrating an example in which the display device of FIG. 1 operates in an active period.

Referring to FIGS. 1, 2, and 4, the data driver 400 may apply the data voltage VDATA to the pixels P through the data line DL in the active period ACTIVE.

For example, in an emission initialization period EIP of the active period ACTIVE, the first gate signal S1 and the second gate signal S2 may have an activation level, the initialization switch ISW may be turned on, and the data voltage VDATA may be applied to the data line DL. For example, in the emission initialization period EIP of the active period ACTIVE, the data voltage VDATA may be applied to the control electrode (e.g., the first node N1) of the driving transistor T1, and the initialization voltage VINT may be applied to an anode electrode (e.g., the second node N2) of the light emitting element EE (e.g., the light emitting element EE may be initialized). Accordingly, a gate-source voltage of the driving transistor T1 (e.g., a voltage between the control electrode and the second electrode of the driving transistor T1) may be a difference between the data voltage VDATA and the initialization voltage VINT, and the storage capacitor CST may store a voltage corresponding to the difference between the data voltage VDATA and the initialization voltage VINT.

For example, in an emission period EP of the active period ACTIVE, the first gate signal S1 and the second gate signal S2 may have a deactivation level, and the initialization switch ISW may be turned off. For example, in the emission period EP of the active period ACTIVE, the first power voltage ELVDD may be applied to the first electrode of the driving transistor T1, thereby generating a driving current corresponding to the gate-source voltage of the driving transistor T1 (e.g., a voltage between the control electrode and the second electrode of the driving transistor T1). The driving current may flow through the light emitting element EE and the light emitting element EE may emit light.

Figure 5:
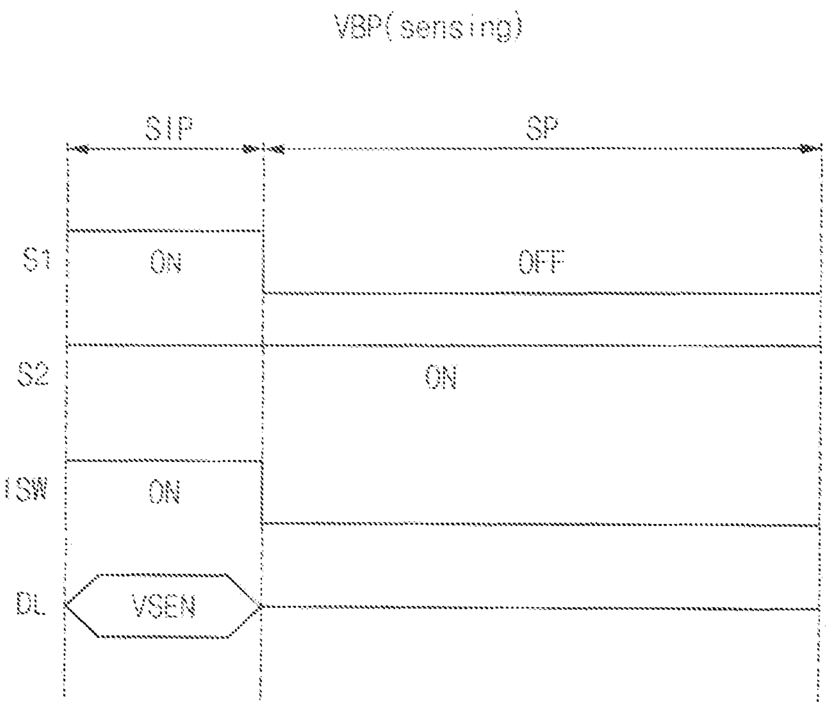
FIG. 5 is a timing diagram illustrating an example in which the display device of FIG. 1 operates in a blank period.

FIG. 5 is a timing diagram illustrating an example in which the display device 1000 of FIG. 1 operates in the blank period VBP. For example, FIG. 5 is a timing diagram illustrating an example in which the display device 1000 of FIG. 1 performs the sensing operation in the blank period VBP. For example, in an embodiment, in the blank period VBP, the first gate signal S1 and the second gate signal S2 applied to the pixels P on which the sensing operation is not performed may have the deactivation level, and a sensing voltage VSEN is not applied to the data lines DL.

Referring to FIGS. 1, 2, and 5, the data driver 400 may generate the sensing data SD corresponding to the driving current of the driving transistor T1 by applying the sensing voltage VSEN to the pixels P on which the sensing operation is performed in the blank period VBP. In an embodiment, the timing controller 200 may receive the sensing data SD from the data driver 400 and may use this data to calculate a mobility value of the driving transistor T1, and may compensate for the input image data based on the mobility value. That is, the display device 1000 may sense the mobility of the driving transistor T1 based on the sensing data SD. However, the sensing operation is not limited to mobility sensing. For example, a threshold voltage of the driving transistor T1 or a characteristic of the light emitting element EE may be sensed through the sensing operation.

For example, in a sensing initialization period SIP, the first gate signal S1 and the second gate signal S2 may have the activation level, the initialization switch ISW may be turned on, and the sensing voltage VSEN may be applied to the data lines DL. For example, in the sensing initialization period SIP, the sensing voltage VSEN may be applied to the control electrode (e.g., the first node N1) of the driving transistor T1, and the initialization voltage VINT may be applied to the anode electrode (e.g., the second node N2) of the light emitting element EE (e.g., the light emitting element EE may be initialized).

For example, in a sensing period SP, the first gate signal S1 may have the deactivation level, the second gate signal S2 may have the activation level, and the initialization switch ISW may be turned off. For example, in the sensing period SP, the first power voltage ELVDD may be applied to the first electrode of the driving transistor T1, thereby generating the driving current corresponding to the gate-source voltage of the driving transistor T1 (e.g., a voltage between the control electrode and the second electrode of the driving transistor T1). The driving current may be applied to the data driver 400. The data driver 400 may generate the sensing data SD corresponding to the driving current.

Figure 6:
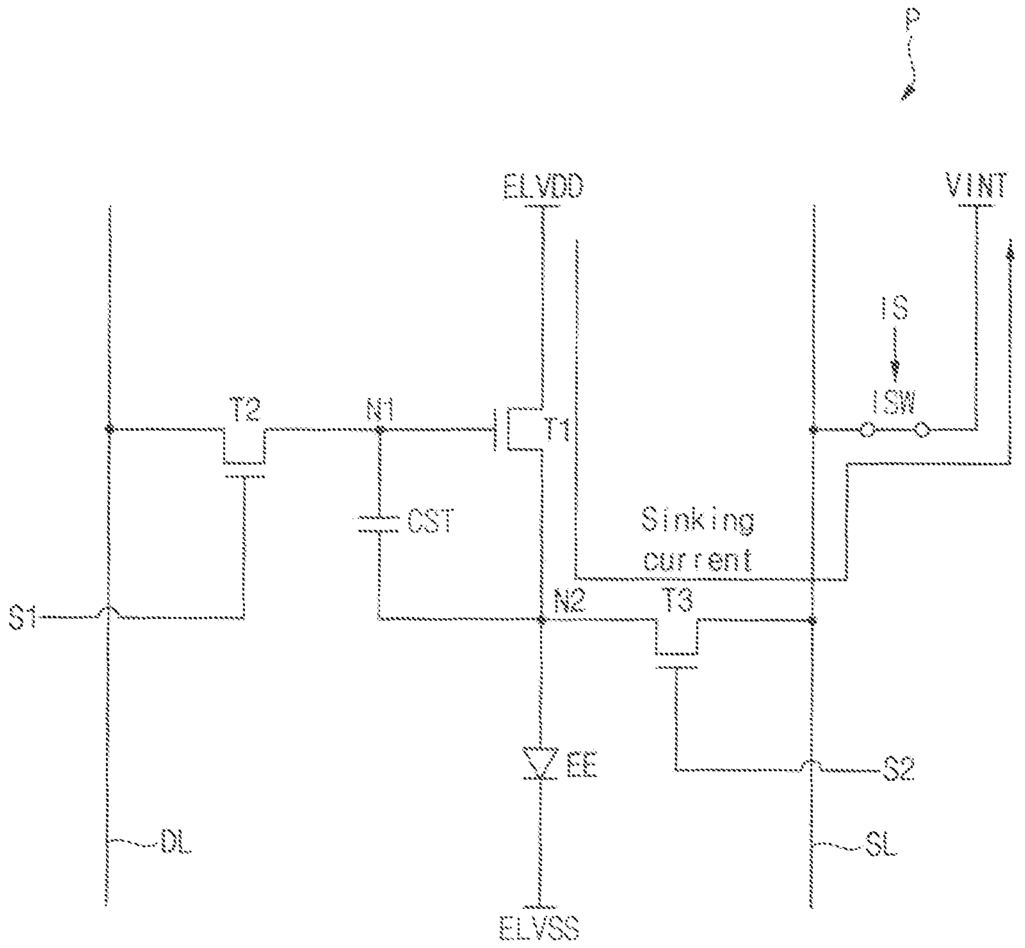
FIG. 6 is a circuit diagram illustrating an example of a sinking current flowing into an initialization voltage generator of the display device of FIG. 1.

FIG. 6 is a circuit diagram illustrating an example of a sinking current flowing into the initialization voltage generator 500 of the display device 1000 of FIG. 1. For convenience of explanation, a repeated description of elements and technical aspects previously described, for example, previously described with reference to FIG. 2, may be omitted.

Referring to FIGS. 1 and 4 to 6, in the emission initialization period EIP of the active period ACTIVE, as the data voltage VDATA is applied to the control electrode of the driving transistor T1, the sinking current may be generated. The sinking current may be applied to the initialization voltage generator 500 through the third transistor T3 and the sensing line SL. Also, the initialization voltage VINT may be lowered due to the sinking current.

For example, the sinking current may increase as the data voltage VDATA increases. Also, the initialization voltage VINT may decrease as the sinking current increases.

The sinking current may also be generated in the sensing initialization period SIP of the blank period VBP. However, since the sensing operation is performed in some of the pixels P, an effect of the sinking current on the initialization voltage VINT may be small. Accordingly, the display device 1000 may generate and transmit the constant current to the initialization voltage generator 500 according to the load of the input image data IMG to reduce a difference between the initialization voltage VINT generated due to the sinking current between the active period ACTIVE and the blank period VBP.

Figures 7, 8:
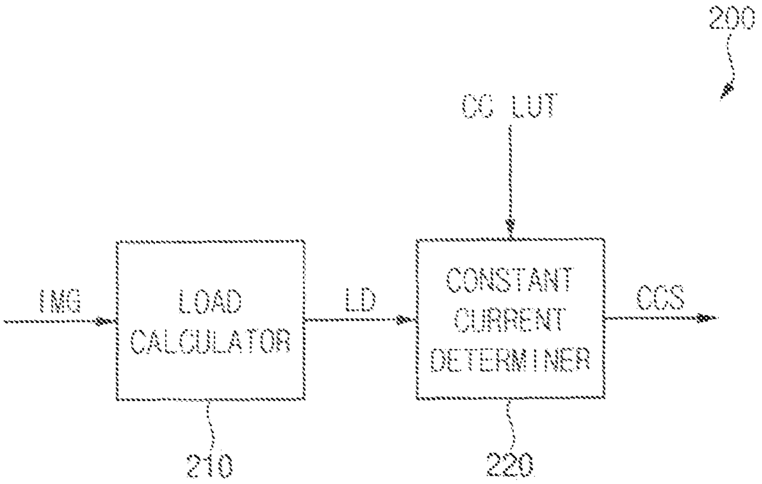
FIG. 7 is a block diagram illustrating an example of a timing controller of the display device of FIG. 1.
FIG. 8 is a table illustrating an example of a constant current lookup table of the display device of FIG. 1.

FIG. 7 is a block diagram illustrating an example of the timing controller 200 of the display device 1000 of FIG. 1. FIG. 8 is a table illustrating an example of a constant current lookup table CC LUT of the display device 1000 of FIG. 1.

Referring to FIGS. 1, 7, and 8, the timing controller 200 may include a load calculator 210 and a constant current determiner 220.

The load calculator 210 may calculate the load LD of the input image data IMG. The load calculator 210 may output the load LD to the constant current determiner 220.

For example, the load LD may be normalized to have a value ranging from 0% to 100%. For example, when the input image data IMG is a full white image, the load LD may be 100%. For example, when the input image data IMG is a full black image, the load LD may be 0%.

The constant current determiner 220 may generate the constant current control signal CCS corresponding to a set constant current value determined based on the load LD. The set constant current value may be a constant current value CCV corresponding to the load LD among constant current values CCV stored in the constant current lookup table CC LUT.

In an embodiment, the set constant current value may be 0 when the load LD is 0 (e.g., 0%). The set constant current value may be greater when the load LD is greater than a first reference load RLD1 than when the load LD is less than or equal to the first reference load RLD1. For example, the set constant current value may be a first constant current value CCV1 when the load LD is greater than 0 and less than or equal to the first reference load RLD1, the set constant current value may be a second constant current value CCV2 greater than the first constant current value CCV1 when the load LD is greater than the first reference load RLD1 and less than or equal to a second reference load RLD2, and the set constant current value may be a third constant current value CCV3 greater than the second constant current value CCV2 when the load LD is greater than the second reference load RLD2.

For example, as shown in FIG. 8, when the load LD is 0%, the set constant current value may be 0 mA. When the load LD is greater than 0% and less than or equal to 30%, the set constant current value may be 100 mA. When the load LD is greater than 30% and less than or equal to 60%, the set constant current value may be 200 mA. When the load LD is greater than 60%, the set constant current value may be 300 mA.

Figure 9:
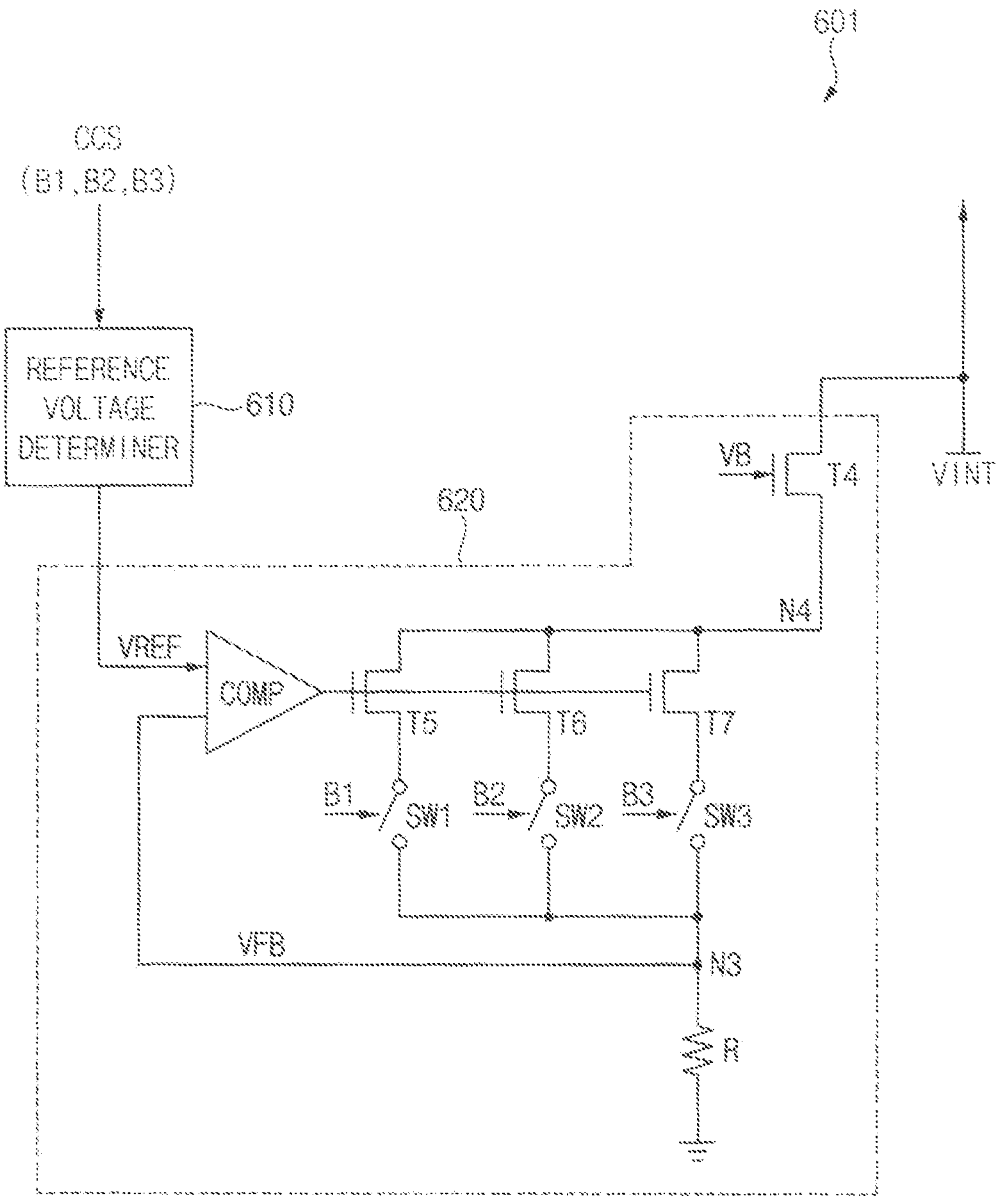
FIG. 9 is a diagram illustrating an example of a constant current generator of the display device of FIG. 1.
Figure 11:
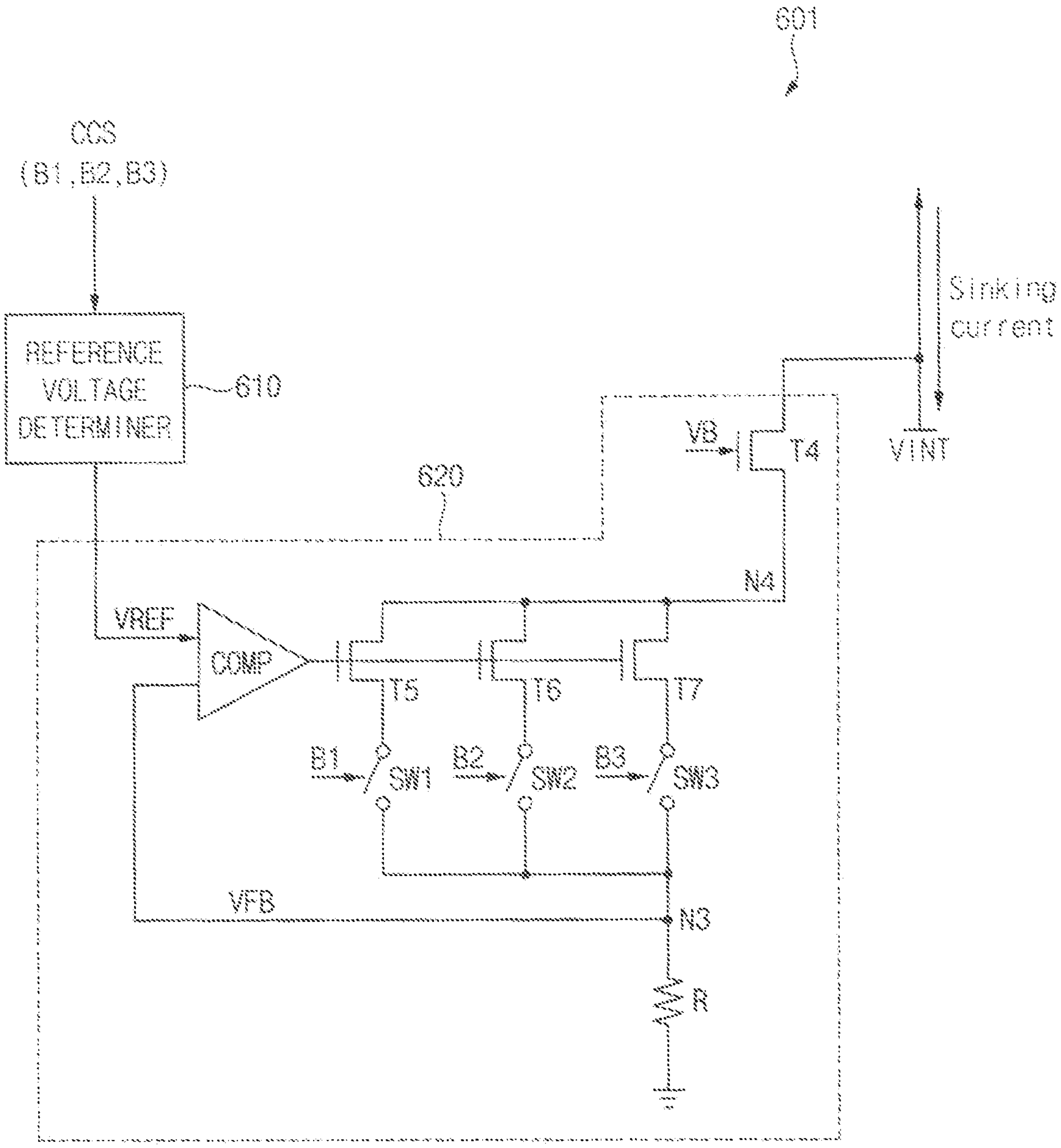
FIG. 11 is a diagram illustrating an example of a constant current generator in an active period of the display device of FIG. 1.
Figure 12:
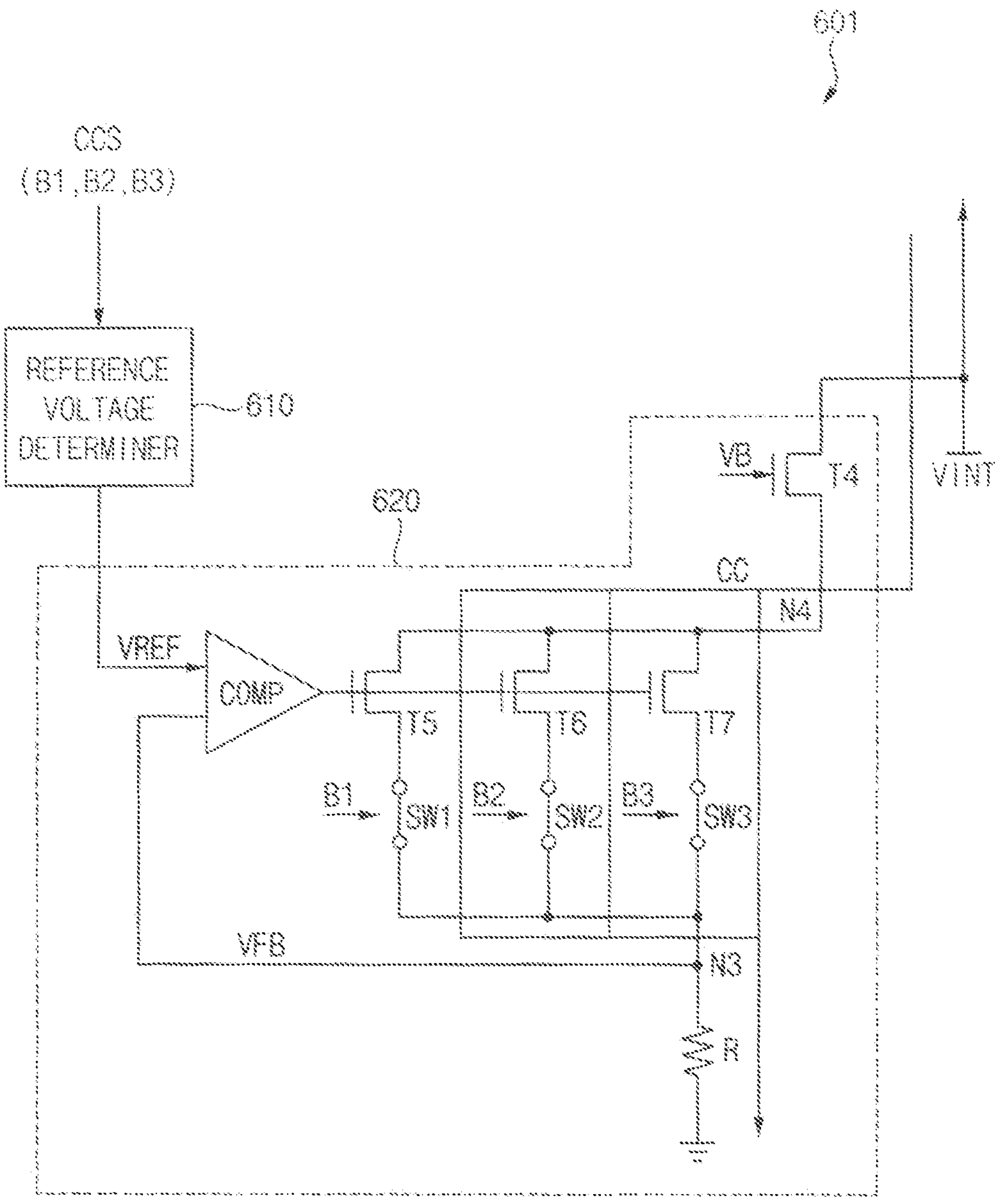
FIG. 12 is a diagram illustrating an example of a constant current generator in a blank period of the display device of FIG. 1.
Figure 13:
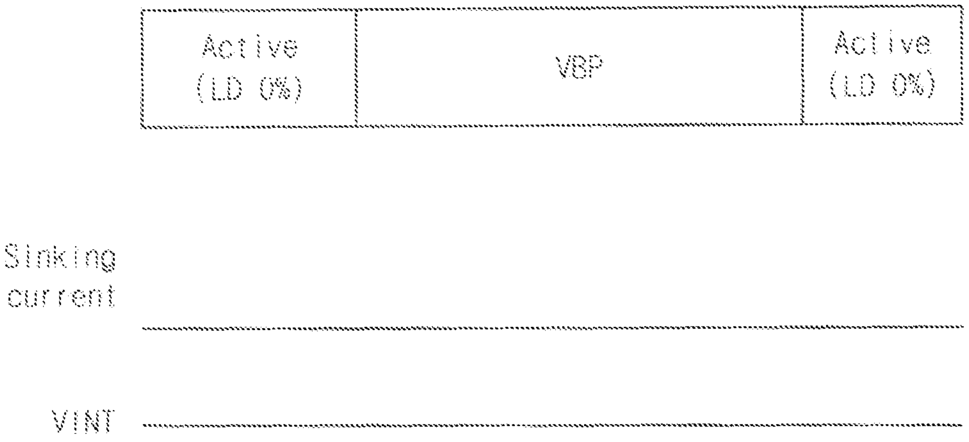
FIGS. 13 to 15 are diagrams illustrating an example of an initialization voltage of the display device of FIG. 1.
Figure 14:
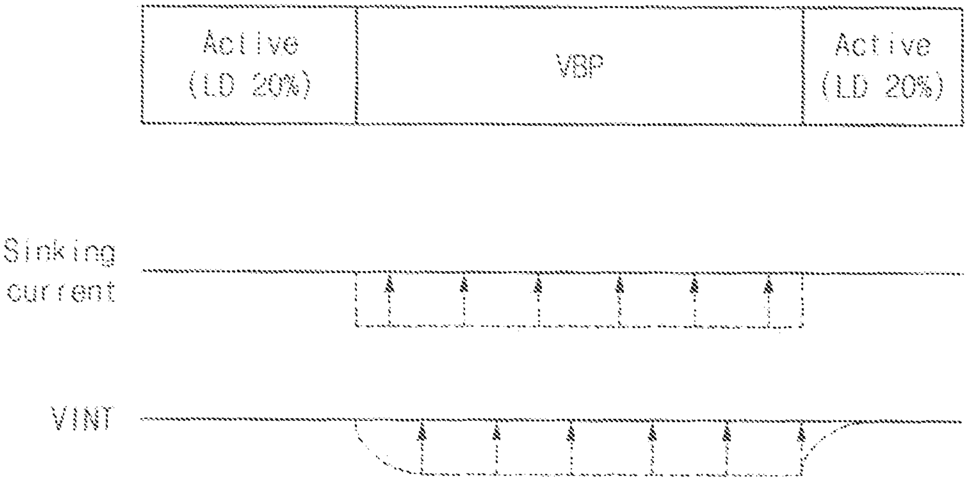
Figure 15:
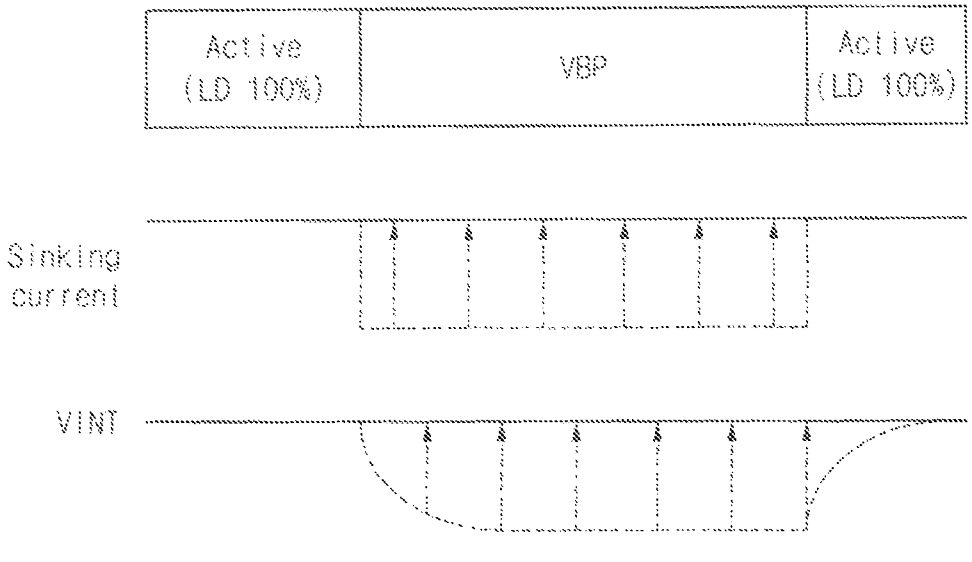

FIG. 9 is a diagram illustrating an example of the constant current generator 601 of the display device 1000 of FIG. 1. FIG. 10 is a table illustrating an example of the constant current control signal CCS of the display device 1000 of FIG. 1. FIG. 11 is a diagram illustrating an example of the constant current generator 601 in the active period ACTIVE of the display device 1000 of FIG. 1. FIG. 12 is a diagram illustrating an example of the constant current generator 601 in the blank period VBP of the display device 1000 of FIG. 1. FIGS. 13 to 15 are diagrams illustrating an example of the initialization voltage VINT of the display device 1000 of FIG. 1. For convenience of explanation, a repeated description of elements and technical aspects will be omitted in the following description.

In FIG. 10, the activation level is represented by a high voltage level HIGH, and the deactivation level is represented by a low voltage level LOW.

Referring to FIGS. 1, 5, and 9 to 12, the constant current generator 601 may generate and transmit the constant current CC to the initialization voltage generator 500 in response to the constant current control signal CCS. The constant current generator 601 may include a reference voltage determiner 610 (also referred to as a reference voltage determiner circuit) that determines a reference voltage VREF based on a first reference signal B1, a second reference signal B2, and a third reference signal B3, and a constant current generation circuit 620 that generates the constant current CC based on the reference voltage VREF.

For example, the constant current generation circuit 620 may include a comparator COMP including a first input terminal that receives the reference voltage VREF, a second input terminal connected to a third node N3, and an output terminal. The constant current generation circuit 620 further includes a fourth transistor T4 including a control electrode that receives the blank signal VB having the activation level in the blank period VBP, a first electrode connected to an output terminal of the initialization voltage generator 500, and a second electrode connected to a fourth node N4. The constant current generation circuit 620 further includes a fifth transistor T5 including a control electrode connected to the output terminal of the comparator COMP, a first electrode connected to the fourth node N4, and a second electrode connected to a first electrode of a first switch SW1. The first switch SW1 switches in response to the first reference signal B1, and includes a first electrode connected to the second electrode of the fifth transistor T5 and a second electrode connected to the third node N3. The constant current generation circuit 620 further includes a sixth transistor T6 including a control electrode connected to the output terminal of the comparator COMP, a first electrode connected to the fourth node N4 and a second electrode connected to a first electrode of a second switch SW2. The second switch SW2 switches in response to the second reference signal B2, and includes a first electrode connected to the second electrode of the sixth transistor T6 and a second electrode connected to the third node N3. The constant current generation circuit 620 further includes a seventh transistor T7 including a control electrode connected to the output terminal of the comparator COMP, a first electrode connected to the fourth node N4, and a second electrode connected to a first electrode of a third switch SW3. The third switch SW3 switches in response to the third reference signal B3, and includes a first electrode connected to the second electrode of the seventh transistor T7 and a second electrode connected to the third node N3. The constant current generation circuit 620 further includes a resistance element R (e.g., a resistor) including a first electrode connected to the third node N3 and a grounded second electrode. As shown in FIG. 9, the transistors may be implemented as NMOS transistors, but is not limited thereto.

A voltage of the output terminal of the comparator COMP may increase as the reference voltage VREF increases, and the comparator COMP may match a voltage of the first input terminal of the comparator COMP and a voltage of the second input terminal of the comparator COMP. For example, the comparator COMP may match a voltage VFB of the third node N3 and the reference voltage VREF. Accordingly, the constant current generator 601 may generate the constant current CC by the reference voltage VREF and the resistance element R, and the constant current CC may increase as the reference voltage VREF increases.

The constant current generator 601 may generate the constant current CC having the set constant current value (e.g., CCV1, CCV2, CCV3, etc.). The constant current control signal CCS may include the first reference signal B1, the second reference signal B2, and the third reference signal B3. The constant current generator 601 may generate the constant current CC based on the first reference signal B1, the second reference signal B2, and the third reference signal B3.

For example, the first reference signal B1 may have the activation level when the set constant current value is greater than or equal to the first constant current value CCV1, the second reference signal B2 may have the activation level when the set constant current value is greater than or equal to the second constant current value CCV2, and the third reference signal B3 may have the activation level when the set constant current value is greater than or equal to the third constant current value CCV3. The reference voltage determiner 610 may determine the reference voltage VREF as a first voltage value when the first reference signal B1 has the activation level and the second reference signal B2 and the third reference signal B3 have a deactivation level, may determine the reference voltage VREF as a second voltage value greater than the first voltage value when the first reference signal B1 and the second reference signal B2 have the activation level and the third reference signal B3 has the deactivation level, and may determine the reference voltage VREF as a third voltage value greater than the second voltage value when the first reference signal B1, the second reference signal B2, and the third reference signal B3 have the activation level. As described above, the constant current CC may increase as the reference voltage VREF increases. Accordingly, the constant current CC may increase as the number of reference signals having the activation level increases.

For example, as shown in FIG. 10, when the first reference signal B1, the second reference signal B2, and the third reference signal B3 have the deactivation level, the constant current CC may be 0 mA. When the first reference signal B1 has the activation level and the second reference signal B2 and the third reference signal B3 have the deactivation level, the constant current CC may be 100 mA (e.g., corresponding to CCV1). When the first reference signal B1 and the second reference signal B2 have the activation level and the third reference signal B3 has the deactivation level, the constant current CC may be 200 mA (e.g., corresponding to CCV2). When the first reference signal B1, the second reference signal B2, and the third reference signal B3 have the activation level, the constant current CC may be 300 mA (e.g., corresponding to CCV3).

The constant current generator 601 may generate the constant current CC in the blank period VBP. In an embodiment, the constant current generator 601 may generate the constant current CC in the blank period VBP and the dummy period.

For example, as shown in FIG. 11, in an embodiment, in the active period ACTIVE, since the fourth transistor T4 is turned off, the constant current generator 601 does not generate and transmit the constant current CC to the initialization voltage generator 500.

For example, as shown in FIG. 12, in the blank period VBP, since the fourth transistor T4 is turned on, the constant current generator 601 may generate and transmit the constant current CC to the initialization voltage generator 500. The constant current generator 601 may determine a magnitude of the constant current CC based on the load LD, and may generate and transmit the constant current CC having a magnitude similar to the sinking current of the active period ACTIVE to the initialization voltage generator 500.

For example, in an embodiment, as shown in FIG. 13, when the load LD is 0%, the sinking current is not generated (or the sinking current may be very small). The sinking current may be generated in the pixels P on which the sensing operation is performed. However, since the number of pixels P on which the sensing operation is performed is small, they are ignored. Accordingly, there may be no difference in the initialization voltage VINT generated due to the sinking current between the active period ACTIVE and the blank period VBP (or the difference may be very small).

For example, as shown in FIG. 14, when the load LD is 20%, the sinking current may be generated. Accordingly, there may be a difference in the initialization voltage VINT generated due to the sinking current between the active period ACTIVE and the blank period VBP. However, by generating the constant current CC, the difference may be eliminated (or the difference may be very small).

That is, since the data voltages increase as the load LD increases, the sinking current may increase as the load LD increases. Accordingly, a fall of the initialization voltage VINT generated due to the sinking current may increase. Accordingly, the display device 1000 may generate a larger constant current as the load LD increases to reduce the difference in the initialization voltage VINT generated due to the sinking current between the active period ACTIVE and the blank period VBP.

Although FIGS. 7 to 15 are described with four constant current values CCV, the present inventive concept is not limited thereto. For example, the number of constant current values CCV may be 2, 3, 5, etc. according to embodiments. Hereinafter, a case with five constant current values CCV will be described with reference to FIGS. 16 to 18.

Figure 16:
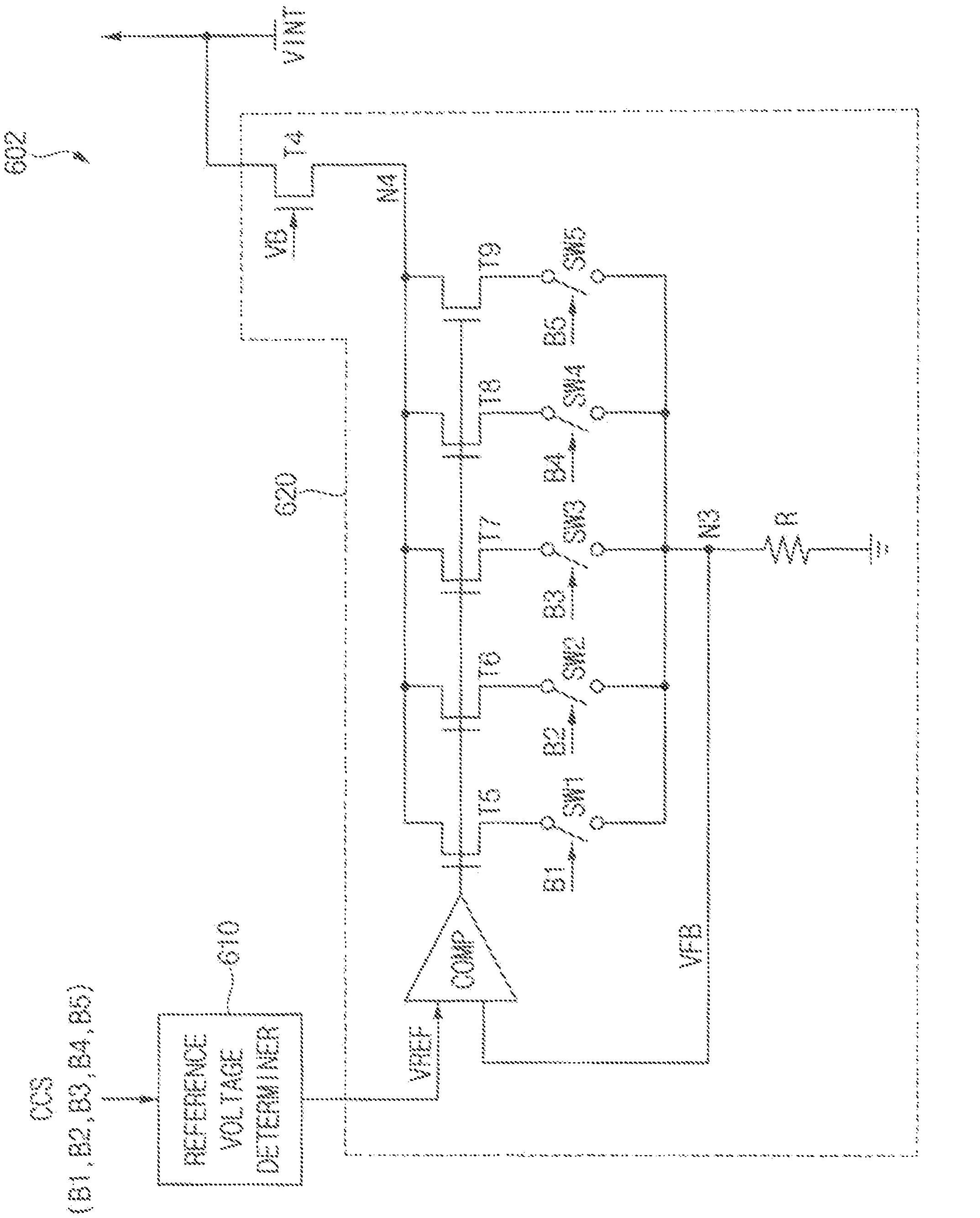
FIG. 16 is a diagram illustrating an example of a constant current generator of a display device according to embodiments of the present inventive concept.

FIG. 16 is a diagram illustrating an example of a constant current generator 602 of a display device according to embodiments of the present inventive concept. FIG. 17 is a table illustrating an example of the constant current lookup table CC LUT of the display device of FIG. 16. FIG. 18 is a table illustrating an example of the constant current control signal CCS of the display device of FIG. 16.

In FIG. 18, the activation level is represented by the high voltage level HIGH, and the deactivation level is represented by the low voltage level LOW.

The display device according to an embodiment described with reference to FIGS. 16 to 18 is substantially the same as the display device 1000 according to an embodiment of FIG. 1, except for configurations according to the number of constant current values CCV. Thus, the same reference numerals are used to refer to the same or similar elements, and any repetitive explanation will be omitted for convenience of description.

Referring to FIGS. 1 and 16, the constant current generation circuit 620 may include a comparator COMP including a first input terminal that receives the reference voltage VREF, a second input terminal connected to a third node N3, and an output terminal. The constant current generation circuit 620 further includes a fourth transistor T4 including a control electrode that receives the blank signal VB having the activation level in the blank period VBP, a first electrode connected to an output terminal of the initialization voltage generator 500, and a second electrode connected to a fourth node N4. The constant current generation circuit 620 further includes a fifth transistor T5 including a control electrode connected to the output terminal of the comparator COMP, a first electrode connected to the fourth node N4, and a second electrode connected to a first electrode of a first switch SW1. The first switch SW1 switches in response to the first reference signal B1, and includes a first electrode connected to the second electrode of the fifth transistor T5 and a second electrode connected to the third node N3. The constant current generation circuit 620 further includes a sixth transistor T6 including a control electrode connected to the output terminal of the comparator COMP, a first electrode connected to the fourth node N4 and a second electrode connected to a first electrode of a second switch SW2. The second switch SW2 switches in response to the second reference signal B2, and includes a first electrode connected to the second electrode of the sixth transistor T6 and a second electrode connected to the third node N3. The constant current generation circuit 620 further includes a seventh transistor T7 including a control electrode connected to the output terminal of the comparator COMP, a first electrode connected to the fourth node N4, and a second electrode connected to a first electrode of a third switch SW3. The third switch SW3 switches in response to the third reference signal B3, and includes a first electrode connected to the second electrode of the seventh transistor T7 and a second electrode connected to the third node N3. The constant current generation circuit 620 further includes an eighth transistor T8 including a control electrode connected to the output terminal of the comparator COMP, a first electrode connected to the fourth node N4, and a second electrode connected to a first electrode of a fourth switch SW4. The fourth switch SW4 switches in response to the fourth reference signal B4, and includes a first electrode connected to the second electrode of the eighth transistor T8 and a second electrode connected to the third node N3. The constant current generation circuit 620 further includes a ninth transistor T9 including a control electrode connected to the output terminal of the comparator COMP, a first electrode connected to the fourth node N4, and a second electrode connected to a first electrode of a fifth switch SW5. The fifth switch SW5 switches in response to the fifth reference signal B5, and includes a first electrode connected to the second electrode of the ninth third transistor T9 and a second electrode connected to the third node N3. The constant current generation circuit 620 further includes a resistance element R (e.g., a resistor) including a first electrode connected to the third node N3 and a grounded second electrode. As shown in FIG. 13, the transistors may be implemented as NMOS transistors, but is not limited thereto.

For example, the set constant current value may be a first constant current value CCV1 when the load LD is greater than 0 and less than or equal to the first reference load RLD1, the set constant current value may be a second constant current value CCV2 greater than the first constant current value CCV1 when the load LD is greater than the first reference load RLD1 and less than or equal to a second reference load RLD2, the set constant current value may be a third constant current value CCV3 greater than the second constant current value CCV2 when the load LD is greater than the second reference load RLD2 and less than or equal to a third reference load RLD3, the set constant current value may be a fourth constant current value CCV4 greater than the third constant current value CCV3 when the load LD is greater than the third reference load RLD3 and less than or equal to a fourth reference load RLD4, and the set constant current value may be a fifth constant current value CCV5 greater than the fourth constant current value CCV4 when the load LD is greater than the fourth reference load RLD4.

For example, as shown in FIG. 17, when the load LD is 0%, the set constant current value may be 0 mA. When the load LD is greater than 0% and less than or equal to 20%, the set constant current value may be 100 mA. When the load LD is greater than 20% and less than or equal to 40%, the set constant current value may be 200 mA. When the load LD is greater than 40% and less than or equal to 60%, the set constant current value may be 300 mA. When the load LD is greater than 60% and less than or equal to 80%, the set constant current value may be 400 mA. When the load LD is greater than 80%, the set constant current value may be 500 mA.

The constant current generator 602 may generate the constant current CC having the set constant current value (e.g., CCV1, CCV2, CCV3, etc.). The constant current control signal CCS may include a first reference signal B1, a second reference signal B2, a third reference signal B3, a fourth reference signal B4, and a fifth reference signal B5. The constant current generator 602 may generate the constant current CC based on the first reference signal B1, the second reference signal B2, the third reference signal B3, the fourth reference signal B4, and the fifth reference signal B5.

For example, the first reference signal B1 may have the activation level when the set constant current value is greater than or equal to the first constant current value CCV1, the second reference signal B2 may have the activation level when the set constant current value is greater than or equal to the second constant current value CCV2, the third reference signal B3 may have the activation level when the set constant current value is greater than or equal to the third constant current value CCV3, the fourth reference signal B4 may have the activation level when the set constant current value is greater than or equal to the fourth constant current value CCV4, and the fifth reference signal B5 may have the activation level when the set constant current value is greater than or equal to the fifth constant current value CCV5. The reference voltage determiner 610 may determine the reference voltage VREF as a first voltage value when the first reference signal B1 has the activation level and the second reference signal B2, the third reference signal B3, the fourth reference signal B4, and the fifth reference signal B5 have the deactivation level, may determine the reference voltage VREF as a second voltage value greater than the first voltage value when the first reference signal B1 and the second reference signal B2 have the activation level and the third reference signal B3, the fourth reference signal B4, and the fifth reference signal B5 have the deactivation level, may determine the reference voltage VREF as a third voltage value greater than the second voltage value when the first reference signal B1, the second reference signal B2, and the third reference signal B3 have the activation level and the fourth reference signal B4 and the fifth reference signal B5 have the deactivation level, may determine the reference voltage VREF as a fourth voltage value greater than the third voltage value when the first reference signal B1, the second reference signal B2, the third reference signal B3, and the fourth reference signal B4 have the activation level and the fifth reference signal B5 have the deactivation level, and may determine the reference voltage VREF as a fifth voltage value greater than the fourth voltage value when the first reference signal B1, the second reference signal B2, the third reference signal B3, the fourth reference signal B4, and the fifth reference signal B5 have the activation level.

For example, when the first reference signal B1, the second reference signal B2, the third reference signal B3, the fourth reference signal B4, and the fifth reference signal B5 have the deactivation level, the constant current CC may be 0 mA. When the first reference signal B1 has the activation level and the second reference signal B2, the third reference signal B3, the fourth reference signal B4, and the fifth reference signal B5 have the deactivation level, the constant current CC may be 100 mA (e.g., corresponding to CCV1). When the first reference signal B1 and the second reference signal B2 have the activation level and the third reference signal B3, the fourth reference signal B4, and the fifth reference signal B5 have the deactivation level, the constant current CC may be 200 mA (e.g., corresponding to CCV2). When the first reference signal B1, the second reference signal B2, and the third reference signal B3 have the activation level and the fourth reference signal B4 and the fifth reference signal B5 have the deactivation level, the constant current CC may be 300 mA (e.g., corresponding to CCV3). When the first reference signal B1, the second reference signal B2, the third reference signal B3, and the fourth reference signal B4 have the activation level and the fifth reference signal B5 has the deactivation level, the constant current CC may be 400 mA (e.g., corresponding to CCV4). When the first reference signal B1, the second reference signal B2, the third reference signal B3, the fourth reference signal B4, and the fifth reference signal B5 have the activation level, the constant current CC may be 500 mA (e.g., corresponding to CCV5).

Figure 19:
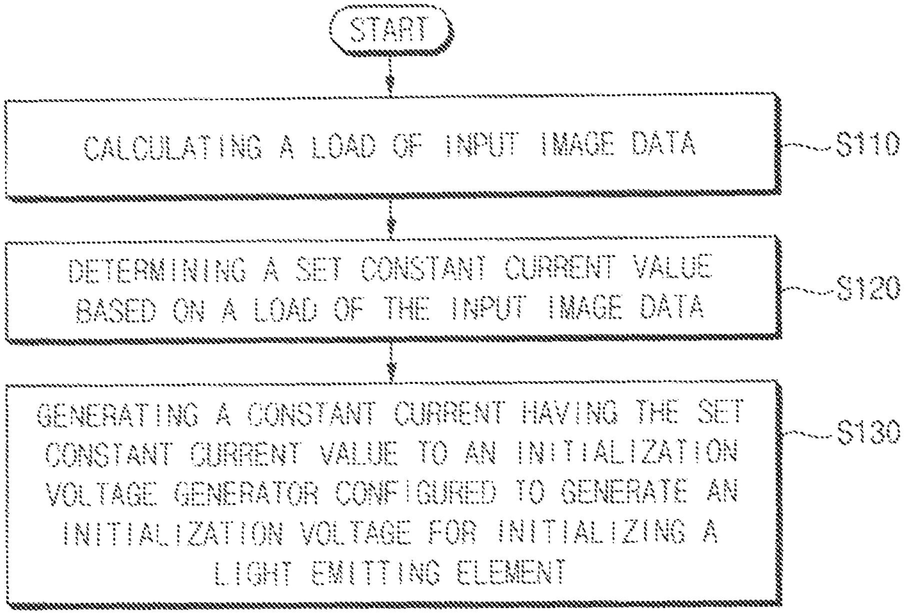
FIG. 19 is a flowchart illustrating a method of driving a display device according to embodiments of the present inventive concept.

FIG. 19 is a flowchart illustrating a method of driving a display device according to embodiments of the present inventive concept.

Referring to FIG. 19, the method may calculate a load of input image data (S110), determine a set constant current value based on a load of the input image data (S120), and generate and transmit a constant current having the set constant current value to an initialization voltage generator configured to generate an initialization voltage for initializing a light emitting element (S130). The method of FIG. 19 may write data voltages generated based on the input image data to pixels including the light emitting element in an active period, and may perform a sensing operation in a blank period. The constant current may be generated in a blank period.

For example, the method of FIG. 19 may determine a set constant current value based on a load of the input image data (S120). The set constant current value may be a constant current value corresponding to the load among constant current values stored in a constant current lookup table. The set constant current value may be greater when the load is greater than a first reference load than when the load is less than or equal to the first reference load.

For example, the set constant current value may be a first constant current value when the load is greater than 0 (e.g., 0%) and less than or equal to a first reference load, the set constant current value may be a second constant current value greater than the first constant current value when the load is greater than the first reference load and less than or equal to a second reference load, and the set constant current value may be a third constant current value greater than the second constant current value when the load is greater than the second reference load.

Figure 20:
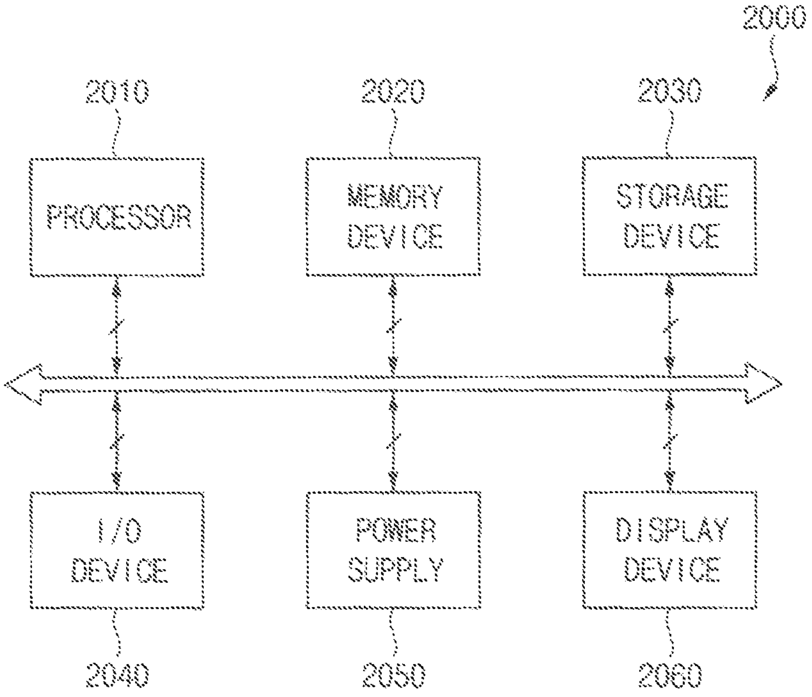
FIG. 20 is a block diagram showing an electronic device according to embodiments of the present inventive concept.
Figure 21:
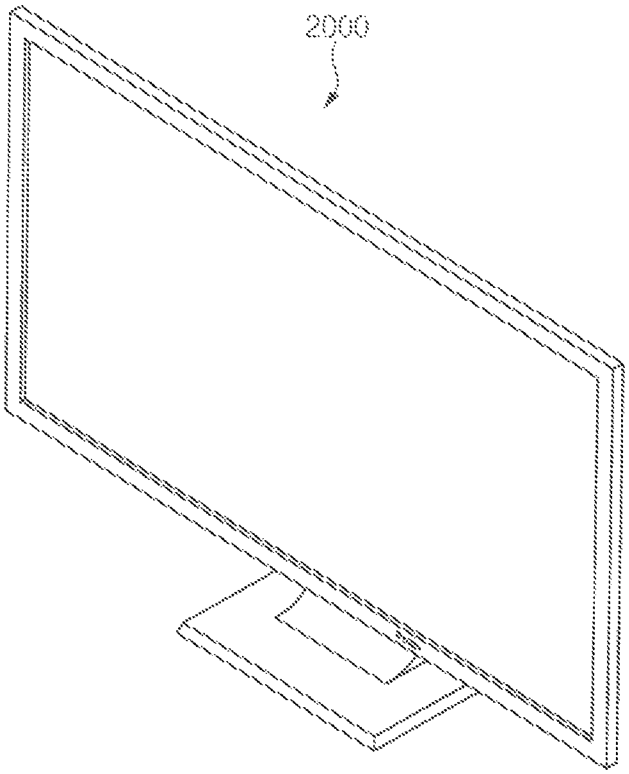
FIG. 21 is a diagram showing an example in which the electronic device of FIG. 11 is implemented as a television.

FIG. 20 is a block diagram showing an electronic device according to embodiments of the present inventive concept. FIG. 21 is a diagram showing an example in which the electronic device of FIG. 20 is implemented as a television.

Referring to FIGS. 20 and 21, the electronic device 2000 may include a processor 2010, a memory device 2020, a storage device 2030, an input/output (I/O) device 2040, a power supply 2050, and a display device 2060. Here, the display device 2060 may be the display device 1000 of FIG. 1. In addition, the electronic device 2000 may further include a plurality of ports for communicating with a video card, a sound card, a memory card, a universal serial bus (USB) device, other electronic devices, etc. In an embodiment, as shown in FIG. 21, the electronic device 2000 may be implemented as a television. However, the electronic device 2000 is not limited thereto. For example, the electronic device 2000 may be implemented as a cellular phone, a smartphone, a smart pad, a smartwatch, a tablet PC, a car navigation system, a computer monitor, a laptop, a head mounted display (HMD) device, etc.

The processor 2010 may perform various computing functions. The processor 2010 may be, for example, a microprocessor, a central processing unit (CPU), an application processor (AP), etc. The processor 2010 may be coupled to other components via an address bus, a control bus, a data bus, etc. Further, the processor 2010 may be coupled to an extended bus such as a peripheral component interconnection (PCI) bus.

The memory device 2020 may store data for operations of the electronic device 2000. For example, the memory device 2020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc.

The storage device 2030 may include, for example, a solid state drive (SSD) device, a hard disk drive (HDD) device, a CD-ROM device, etc.

The I/O device 2040 may include an input device such as, for example, a keyboard, a keypad, a mouse device, a touch pad, a touch screen, etc., and an output device such as, for example, a printer, a speaker, etc. In some embodiments, the I/O device 2040 may include the display device 2060.

The power supply 2050 may provide power for operations of the electronic device 2000. For example, the power supply 2050 may be a power management integrated circuit (PMIC).

The display device 2060 may display an image corresponding to visual information of the electronic device 2000. For example, the display device 2060 may be an organic light emitting display device or a quantum dot light emitting display device, but is not limited thereto. The display device 2060 may be coupled to other components via the buses or other communication links. According to embodiments, the display device 2060 may reduce ripple of an initialization voltage by adjusting the initialization voltage according to a load of input image data. Accordingly, a display device having a desirable a signal-to-noise ratio (SNR) characteristic of a sensing operation may be provided.

Embodiments of the inventive concept may be applied to any electronic device including the display device. For example, embodiments of the inventive concept may be applied to a television (TV), a digital TV, a 3D TV, a mobile phone, a smartphone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

As is traditional in the field of the present inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present inventive concept has been particularly shown and described with reference to embodiments thereof, it will be understood by those of ordinary skill in the art that various changes in form and detail may be made therein without departing from the spirit and scope of the present inventive concept as defined by the following claims.

What is claimed is:

1. A display device, comprising:

a display panel including a plurality of pixels;

a data driver configured to apply a plurality of data voltages generated based on input image data to the pixels;

an initialization voltage generator configured to generate an initialization voltage that initializes a light emitting element included in each of the pixels;

a timing controller configured to generate a constant current control signal based on a load of the input image data; and a constant current generator configured to generate and transmit a constant current to the initialization voltage generator in response to the constant current control signal, wherein the timing controller is configured to generate the constant current control signal corresponding to a set constant current value determined based on the load, and wherein the constant current generator is configured to generate the constant current having the set constant current value.

2. The display device of claim 1, wherein each of the pixels includes:

a first transistor including a control electrode connected to a first node, a first electrode configured to receive a first power voltage, and a second electrode connected to a second node;

a second transistor including a control electrode configured to receive a first gate signal, a first electrode configured to receive the data voltages, and a second electrode connected to the first node;

a third transistor including a control electrode configured to receive a second gate signal, a first electrode configured to receive the initialization voltage, and a second electrode connected to the second node;

a storage capacitor including a first electrode connected to the first node and a second electrode connected to the second node; and the light emitting element including a first electrode connected to the second node and a second electrode configured to receive a second power voltage.

3. The display device of claim 1, wherein the data driver is configured to write the data voltages to the pixels in an active period, and wherein the constant current generator is configured to generate the constant current in a blank period.

4. The display device of claim 3, wherein the data driver is configured to perform a sensing operation in the blank period.

5. The display device of claim 3, wherein the set constant current value is a constant current value corresponding to the load among a plurality of constant current values stored in a constant current lookup table.

6. The display device of claim 3, wherein the set constant current value is 0 when the load is 0.

7. The display device of claim 3, wherein the set constant current value is greater when the load is greater than a first reference load than when the load is less than or equal to the first reference load.

8. The display device of claim 3, wherein the set constant current value is a first constant current value when the load is greater than 0 and less than or equal to a first reference load, wherein the set constant current value is a second constant current value greater than the first constant current value when the load is greater than the first reference load and less than or equal to a second reference load, and wherein the set constant current value is a third constant current value greater than the second constant current value when the load is greater than the second reference load.

9. The display device of claim 8, wherein the constant current control signal includes a first reference signal, a second reference signal, and a third reference signal, wherein the first reference signal has an activation level when the set constant current value is greater than or equal to the first constant current value, wherein the second reference signal has the activation level when the set constant current value is greater than or equal to the second constant current value, wherein the third reference signal has the activation level when the set constant current value is greater than or equal to the third constant current value, and wherein the constant current generator is configured to generate the constant current based on the first reference signal, the second reference signal, and the third reference signal.

10. The display device of claim 9, wherein the constant current generator includes:

a reference voltage determiner circuit configured to determine a reference voltage based on the first reference signal, the second reference signal, and the third reference signal; and a constant current generation circuit configured to generate the constant current based on the reference voltage.

11. The display device of claim 10, wherein the constant current generation circuit includes:

a comparator including a first input terminal configured to receive the reference voltage, a second input terminal connected to a first node, and an output terminal;

a first transistor including a control electrode configured to receive a blank signal having the activation level in the blank period, a first electrode connected to an output terminal of the initialization voltage generator, and a second electrode connected to a second node;

a second transistor including a control electrode connected to the output terminal of the comparator, a first electrode connected to the second node, and a second electrode connected to a first electrode of a first switch;

the first switch configured to switch in response to the first reference signal, and including a first electrode connected to the second electrode of the second transistor and a second electrode connected to the first node;

a third transistor including a control electrode connected to the output terminal of the comparator, a first electrode connected to the second node and a second electrode connected to a first electrode of a second switch;

the second switch configured to switch in response to the second reference signal, and including a first electrode connected to the second electrode of the third transistor and a second electrode connected to the first node;

a fourth transistor including a control electrode connected to the output terminal of the comparator, a first electrode connected to the second node, and a second electrode connected to a first electrode of a third switch;

the third switch configured to switch in response to the third reference signal, and including a first electrode connected to the second electrode of the fourth transistor and a second electrode connected to the first node; and a resistance element including a first electrode connected to the first node and a grounded second electrode.

12. The display device of claim 11, wherein a voltage of the output terminal of the comparator increases as the reference voltage increases, and wherein the comparator matches a voltage of the first input terminal of the comparator and a voltage of the second input terminal of the comparator.

13. The display device of claim 12, wherein the reference voltage determiner circuit is configured to determine the reference voltage as a first voltage value when the first reference signal has the activation level and the second reference signal and the third reference signal have a deactivation level, wherein the reference voltage determiner circuit is configured to determine the reference voltage as a second voltage value greater than the first voltage value when the first reference signal and the second reference signal have the activation level and the third reference signal has the deactivation level, and wherein the reference voltage determiner circuit is configured to determine the reference voltage as a third voltage value greater than the second voltage value when the first reference signal, the second reference signal, and the third reference signal have the activation level.

14. A method of driving a display device, comprising:

calculating a load of input image data;

determining a set constant current value based on the load of the input image data;

generating a constant current control signal corresponding to the set constant current value determined based on the load of the input image data; and generating and transmitting, in response to the constant current control signal, a constant current having the set constant current value to an initialization voltage generator configured to generate an initialization voltage that initializes a light emitting element.

15. The method of claim 14, further comprising:

writing a plurality of data voltages generated based on the input image data to a plurality of pixels including the light emitting element in an active period, wherein the constant current is generated in a blank period.

16. The method of claim 15, further comprising:

performing a sensing operation in the blank period.

17. The method of claim 14, wherein the set constant current value is a constant current value corresponding to the load among a plurality of constant current values stored in a constant current lookup table.

18. The method of claim 14, wherein the set constant current value is greater when the load is greater than a first reference load than when the load is less than or equal to the first reference load.

19. The method of claim 14, wherein the set constant current value is a first constant current value when the load is greater than 0 and less than or equal to a first reference load, wherein the set constant current value is a second constant current value greater than the first constant current value when the load is greater than the first reference load and less than or equal to a second reference load, and wherein the set constant current value is a third constant current value greater than the second constant current value when the load is greater than the second reference load.

* * * * *